Sept. 9, 1969 R. H. NEUSEL 3,466,567
ELECTROSTATIC GAS BY-PASS FOR ION LASERS WITH HOT CATHODES
Filed Aug. 1, 1966
Fig. 1.
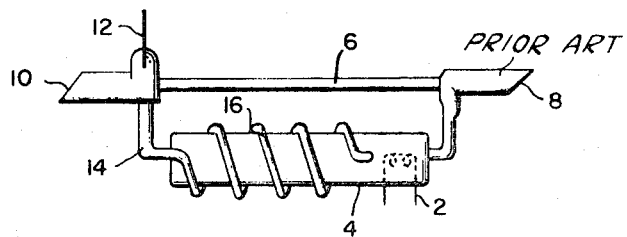
Fig. 2.
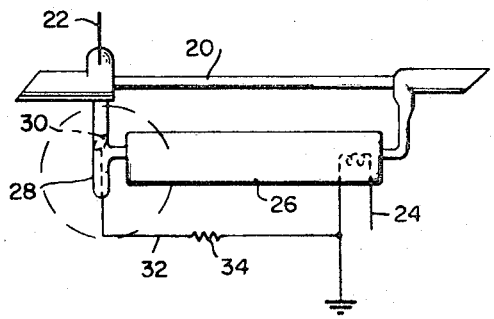
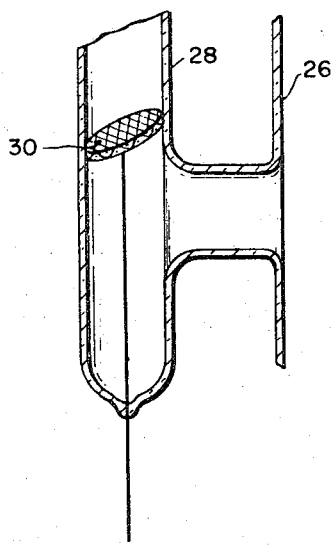
Fig. 3.
Robert H. Neusel,
INVENTOR.
BY.
*Donald W. Graves*
ATTORNEY.

United States Patent Office 3,466,567
Patented Sept. 9, 1969

3,466,567
ELECTROSTATIC GAS BY-PASS FOR ION LASERS WITH HOT CATHODES
Robert H. Neusel, Palos Verdes Estates, Calif., assignor to TRW Inc., Redondo Beach, Calif., a corporation of Ohio
Filed Aug. 1, 1966, Ser. No. 569,366
Int. Cl. H01s 3/22
U.S. Cl. 331—94.5
6 Claims

ABSTRACT OF THE DISCLOSURE

To prevent gas pumping for gas or ion lasers a high electrical impedance is provided along with a low gas impedance by maintaining a screen or grid in the gas bypass tube which is maintained at the potential of one of the electrodes.

---

Within the last few years, lasers have come into their own as a useful device in such fields as communications. The term "laser" stands for light amplification by stimulated emission of radiation. These devices, when stimulated by a suitable energy source, produce a coherent beam of light or radiation having a relatively high energy level. The first lasers were of the solid state variety such as a cylinder of pink ruby containing a small percentage of chromium. The end faces of the cylinder are parallel and one of the end faces is provided with a completely reflecting surface with the other end face partially reflecting. When the ruby cylinder is irradiated on its side by light from a flash lamp, a portion of the input energy is absorbed by the ruby and funneled into a narrow emission line of the trivalent chromium ion. The radiation emerges coherently through the partially reflecting end of the ruby.

Another type of laser is the so called chemical laser. This laser operates on the release of energy associated with the making and breaking of chemical bonds.

Still another type of laser is the gas ion laser. This type typically uses an electrical energy source. Typically, a longitudinal tube is provided which has therein a gas which is ionized and the ions excited to a given energy level by an electric discharge between an anode and a cathode such that stimulated emission from this level produces the laser effect.

When DC current is used, the pulses can be continuous or intermittent. In this type of laser, where pulsed DC or continuous DC excitation is used, a phenomenon known as gas pumping results. This phenomenon consists of a pressure rise in the gas adjacent one of the electrodes with or without a corrsponding drop of pressure at other portions of the tube. Often this pressure rise occurs at the anode. The net result of this pressure rise is a reduction in the gain of the laser.

To counteract this affect, it has been suggested that a gas by-pass running from the anode to the cathode be provided. This gas by-pass should be constructed such that there would be a low gas impedance and a high electrical impedance to prevent a discharge from the electrode through the gas by-pass to the anode which would in effect operate as a short circuit. The difficulty with this approach is that ordinarily when the by-pass is constructed so as to have a low gas impedance, it will likewise tend to lower the electrical impedance. By raising the electrical impedance through proper construction, the gas impedance is likewise raised resulting in difficulties in design. One approach to obviate this phenomenon although not connected with lasers, is described in the U.S. Patent to Lake, No. 3,117,248, in which the geometry and design of the gas by-pass tubes in a glow discharge type device is such that relatively high impedance is provided while presumably a low gas impedance occurs.

This invention obviates the disadvantages of the prior art examples in that a high electrical impedance is provided along with a low gas impedance. This is accomplished by maintaining a screen or grid in the gas by-pass tube which is maintained at the potential of one of the electrodes which, in the given example, is the cathode.

This screen has a low emissivity while the cathode itself has a high emissivity. This prevents an electrical discharge through the gas by-pass tube while at the same time allowing gas to freely pass from a region of the anode to the region of the cathode so as to maintain a fairly uniform pressure throughout the device. If required, a high electrical resistance can be provided between the screen and the cathode to further insure that a discharge will not occur between the screen and the anode.

The objects and advantages of this invention will become apparent as this description proceeds taken in conjunction with the drawing in which:

FIGURE 1 is a schematic view of a typical prior art structure.

FIGURE 2 is a schematic view of a laser tube constructed according to this invention, and FIGURE 3 is an enlarged view of the screen as it is installed in the gas by-pass tube shown in FIGURE 2.

Referring now to FIGURE 1, there is shown a prior art example which represents one approach to the problem of cathaphoresis in gas laser tubes. Shown at 2 is a cathode located within tube 4. The laser tube is shown at 6 which has Brewster windows 8 and 10. As so far described, this structure is conventional and forms no part of the invention.

An anode 12 and a gas by-pass tube 14 with coils 16 entering cylinder 4 is provided thus providing a passage for gases from anode 12 to cathode 2. As previously mentioned, during operation of a pulsed or continuous DC mode gas laser, the phenomena of gas pumping or pressure build up of gases occurs. This takes the form of a pressure build up adjacent anode 12 which results in a lowering of the gain of the laser.

To counteract this, a gas by-pass tube 14 is provided. With this construction, however, to prevent electrical discharge from cathode 2 to anode 12 through gas by-pass tube 14, tube 14 must of necessity either have a small cross section and relatively short length or vice versa as shown by coil 16. This represents a trade off since, to provide high electrical impedance, of necessity, a relatively high gas impedance results which still leaves a residual pressure drop from cathode 2 to anode 12.

To solve this problem, this invention provides a gas by-pass tube having a low gas impedance while preventing an electrical discharge from the cathode to the anode through the gas by-pass tube. Referring to FIGURE 2, a laser tube similar to that shown in FIGURE 1 is shown at 20. An anode 22 and a cathode 24 is provided with a gas by-pass 28 having a relatively large cross sectional area and short distance. A tube 26 is provided which contains the cathode and also acts as a gas reservoir tube. Within short tube 28 is located a metallic screen or grid 32 which is connected by means of line 32 to cathode 24. This screen or grid has a low emissivity such that an electrical discharge from grid 30 to anode 22 is prevented. It is sometimes required in addition to provide a relatively high resistance 34 between cathode 24 and grid 30. This high resistance prevents an appreciable current flow from the cathode to the screen. Another advantage over the structure shown in FIGURE 1 is its relative simplicity and resistance to breakage.

Thus, it can be seen that by this invention a relatively simple device has been provided to prevent cathaphoresis in gas laser tubes.

What is claimed is:
1. In a gas laser device having a longitudinal gas filled tube with a cathode adjacent one end and an anode adjacent the other end with a gas by-pass connecting said ends, that improvement which comprises;
   a metallic grid located within said gas by-pass, said grid having a voltage potential equal to that of said cathode.
2. In a gas laser device according to claim 1 wherein said grid comprises a screen.
3. In a gas laser device according to claim 1 wherein said grid is located adjacent said anode.
4. In a gas laser device according to claim 3 wherein said grid is electrically connected to said cathode.
5. In a gas laser device according to claim 4 wherein a substantially large electrical resistance is placed between said grid and said cathode.
6. In a gas laser device according to claim 1 wherein said grid has a substantially lower rate of emissivity than said cathode.

References Cited

UNITED STATES PATENTS 3,394,320    7/1968    Medicus _____ 331—94.5

OTHER REFERENCES

Gordon et al., "Gas Pumping in Continuously Operated Ion Lasers," Bell System Technical Journal, vol. 43, July 1964, pp. 1827–1829.

ROY LAKE, Primary Examiner

SIEGFRIED H. GRIMM, Assistant Examiner

U.S. Cl. X.R.

313—204; 330—4.3